Nov. 22, 1949     C. L. STURTEVANT ET AL     2,488,570
NAVIGATIONAL PROTRACTOR FOR USE ON CHARTS
Filed Sept. 19, 1945
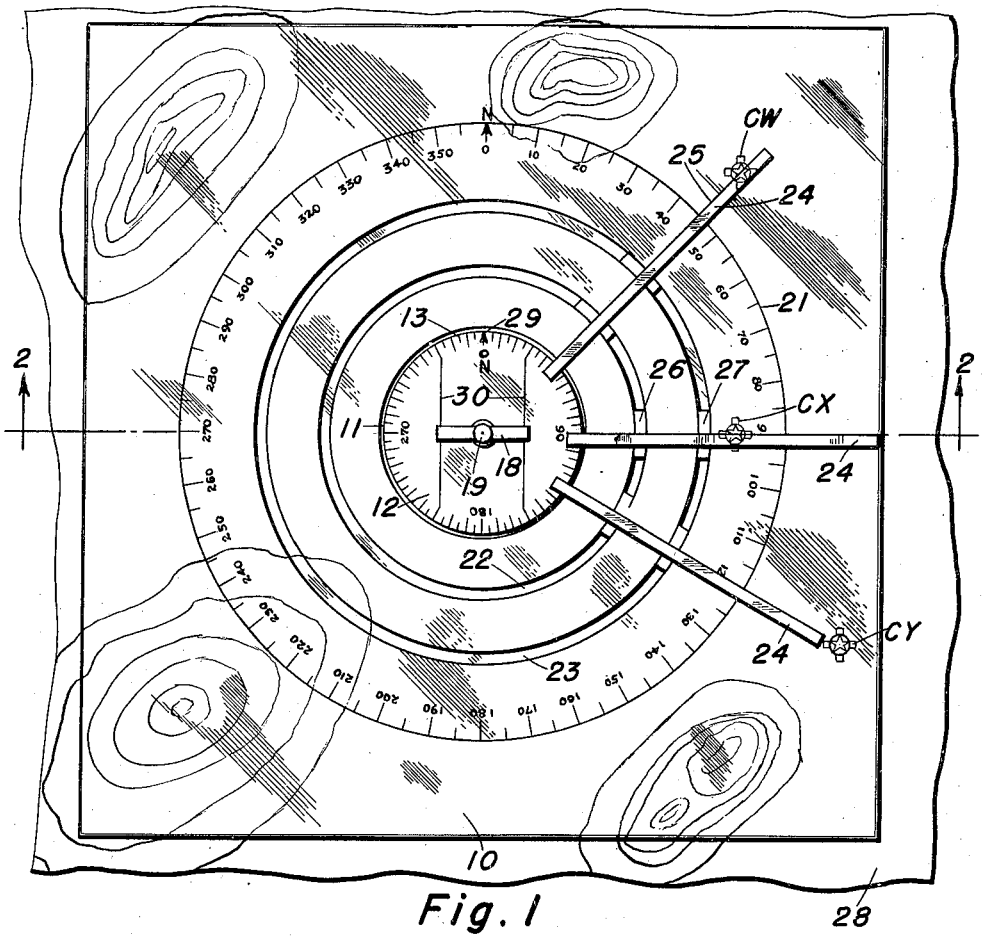
Fig. 1
Fig. 2
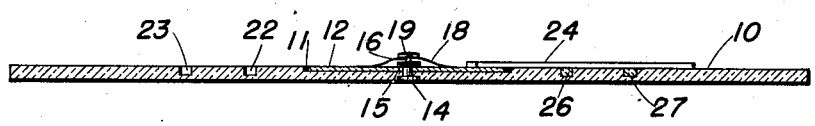
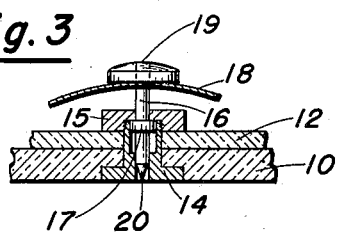
Fig. 3
Inventors
Charles L. Sturtevant
William R. McCathran Jr.
By Ralph L. Chappell
Attorney Patented Nov. 22, 1949

2,488,570

UNITED STATES PATENT OFFICE 2,488,570

NAVIGATIONAL PROTRACTOR FOR USE ON CHARTS

Charles L. Sturtevant, United States Navy, and William R. McCathran, Jr., Washington, D. C.

Application September 19, 1945, Serial No. 617,417

7 Claims. (Cl. 33—75)

(Granted under the act of March 3, 1883, as amended April 30, 1928; 370 O. G. 757)

The present invention relates to new and useful improvements in navigational instruments, and more particularly to such improvements in an instrument for computing and solving certain problems encountered in the navigation of aircraft or other vehicles.

In general, the invention is concerned with the provision of a navigational instrument or protractor which is adapted to solve certain navigational problems, such as the location or "fix" of a navigating craft by means of relative bearings taken on radio beacons or similar navigational aids. The instrument includes a plurality of arms movable about a common center axis which is also the center of a compass rose mounted on the supporting base member. Thus, in navigating aircraft as an example, bearings are taken on radio beacons which are properly identified and each bearing may be indicated by shifting one of the arms to the corresponding position according to a degree marking on the compass rose. The other arms may be similarly positioned with respect to bearings taken on other radio beacons. The center of the compass rose marks the intersection of the bearings or station lines designated by the position of the movable arms and, thus, positions the "fix" which may be marked on a map or chart placed under the instrument with the arms aligned with the corresponding radio beacons on the map or chart.

An object of the present invention is to provide a navigational instrument of the above type wherein the arms for marking a radio bearing or station line are completely disconnected one from the other so that each may be moved independently in order to improve the accuracy of the bearings.

A further object of the invention is to provide a navigational instrument of the above type wherein movement of one arm has no tendency, frictionally or otherwise, to move another arm which has been previously positioned with respect to the bearing or station lines.

A still further object of the invention is to provide a navigational instrument of the above type wherein the compass rose is also movable independently of the movable arms so that it may be positioned relative to the map or chart and a stationary compass marking for determining the true heading of the navigating craft.

The above and other objects will in part be obvious and will be hereinafter more fully pointed out.

In the accompanying drawings:

Fig. 1 is a top plan view showing the instrument located on a map with the arms positioned in line with the radio beacons whose bearings have been previously taken;

Fig. 2 is a sectional view taken substantially along the line 2—2 of Fig. 1; and Fig. 3 is an enlarged fragmentary sectional view showing the details of the pointer or scribe for marking the "fix" on the map or chart.

Referring more in detail to the accompanying drawings, the instrument includes a base 10 made of any suitable transparent and substantially rigid material such as "Plexiglas," or the like. The base member is centrally countersunk to provide a circular depression 11 in which a rotatable disc 12 is fitted. The disc is connected by central pivot means to the base member and is provided around the periphery thereof with compass markings 13 in degrees. The pivot means includes a longitudinally bored pivot element 14 which extends through aligned apertures in the disc 12 and the base member 10. The upper end of the pivot pin 14 is externally threaded to receive a securing nut 15 through which a plunger or scribe 16 extends. The plunger is provided with an internal collar 17 to limit outward movement thereof as a leaf spring 18 bearing on the disc 12 and the finger portion 19 of the plunger 16, exerts an upward force tending to normally elevate the pointed end 20 of the plunger. The finger portion 19 facilitates depressing of the plunger when the instrument is positioned on a map or chart in the manner to be hereinafter described. The spring 18 bearing on the disc 12 acts as a brake or restraining means to hold the disc 12 in proper position.

The base member is also provided with outer cylindrical compass markings 21 concentric with the movable compass disc 12. The base member is also provided with a pair of inner and outer circular slots 22, 23, respectively, which are also concentric with the center of the compass disc 12. As illustrated, there are three arms 24, and the description of the manner of securing one in the circular slots will serve to describe the others which are identical. Each arm 24 has one edge 25 thereof exactly aligned with and extending radially of the center axis of the compass disc 12. This edge 25 serves as the measuring or marking edge. Guide shoes 26, 27, are snugly fitted within the inner and outer slots 22, 23, respectively, and suitably secured to the arms 24. Each shoe is shaped along an arc which will exactly fit the corresponding circular edges of the slots so that each arm will be exactly guided for accurate measurement of bearings to be recorded. The inner end of each arm extends over the compass markings 13 on the inner compass rose and the outer end of each arm extends outwardly beyond the compass markings 21 so that, if necessary, the degree markings on both compass roses may be aligned with the edge 25 of the arms for more accurate reading.

It will be seen that the rotatable compass disc 12 is free to rotate about the pivot means without tending to shift any predetermined setting of the arms 24. Similarly, each arm 24 may be shifted independently and there is no frictional contact between the arms tending to shift any one of them from a predetermined set position.

In using the instrument, bearings on radio beacons are taken in the usual manner aboard ship by means of an instrument having its zero index set to the fore and aft centerline of the ship and are identified also in a conventional manner. For a first bearing, one of the arms is shifted to the proper degree marking on the inner compass rose for recording the relative bearing of the radio beacon. The other arms are similarly shifted for setting the relative bearings of other separate radio beacons taken at approximately the same time. After the arms have been positioned, they serve as station or bearing lines so that the entire instrument may be placed on a map or chart 28 with each arm lined up with the corresponding radio beacons. Thus, as shown in Fig. 1, the arms are aligned with the radio beacons CW, CX and CY. Since the marking or measuring edge 25 of each arm extends radially from the center axis of the compass disc 12, the plunger 16 may be depressed against the action of the spring 18 so that the pointed end 20 thereof will depress or otherwise mark the chart at the intersection of the station lines and this will be the radio "fix" obtained from the bearings taken according to the position of the movable arms. In order to obtain the true heading of the ship, in degrees with respect to true north, the zero index 29 of the outer scale will, after the three arms 24 have, respectively, been placed on the three observed bearings of the observation beacons on outer scale 21 as above described, point in the direction of the heading of the ship with respect to the observed bearings provided the instrument, by means of which the three observations were made, had its zero index set to the fore and aft centerline of the ship. The true heading of the ship may then be obtained, in degrees, from a compass rose on the chart with its zero index set to the meridian. This procedure is commonly known as the three point method of fixing a position from known landmarks. On the other hand, without moving the instrument from its set position on the chart, the inner compass disc 12 may be shifted so that the mutually parallel lines 30 thereon are parallel to a meridian on the chart. With this shifted position of the inner compass disc 12, one of the arms may be moved with the measuring edge 25 thereof aligned with the north reading on the inner compass rose 13 and the corresponding measurement by the edge 25 on the outer compass marking 21 will give the true heading in degrees. Variation and deviation correction may be made in a conventional manner.

While one form of the invention has been shown for purposes of illustration, it is to be clearly understood that various changes in the details of construction, arrangement of parts and mode of operation may be made without departing from the scope of the invention as set forth in the appended claims.

The invention described herein may be manufactured and used by or for the Government of the United States of America for governmental purposes without the payment of any royalties thereon or therefor.

What we claim is:

1. A navigational instrument comprising a base member having compass markings thereon, and a plurality of circular slots concentric with the said compass markings, a plurality of arms adapted to cooperate with the compass markings for indicating station bearings, a plurality of arcuate shoes on each of said arms fitting one shoe on each arm in each of said slots whereby the shoes may be accurately guided for movement in said slots and each of said arms being connected radially with respect to its shoes whereby to permit circular movement of the said arms about the center axis of said compass markings.

2. A navigational instrument for indicating bearings taken on navigational aids and adapted to be positioned on a map or chart in order to locate the "fix," comprising a transparent base member having a compass rose and inner and outer grooves concentric thereto, pivot means carried by said base member centrally of said grooves, a disc containing a compass rose carried by said base member within and concentric with said inner groove and rotatable about said pivot means, and a plurality of arms each having a pair of shoes slidable one each in each of said grooves for guided independent movement in said grooves whereby to permit indication of bearings on said compass roses by said arms which may be located over corresponding navigational aids on the map with the intersection of the arms locating the "fix."

3. A navigational instrument as claimed in claim 2, wherein the pivot means includes a scribe point for marking the "fix" on the map and wherein a spring bearing on the disc serves as a means to restrain rotation thereof and also serves to normally elevate the scribe point.

4. A navigation chart protractor comprising a base member having a compass rose thereon and provided on its face with a pair of U-shaped circular slots concentric with said compass rose, and a plurality of radial arms each supported by a pair of arcuate shoes slideably fitted one to each of said slots, whereby said arms are adapted to rotate about the center of said compass rose to indicate bearings thereon.

5. A navigation chart protractor comprising a base member having an outer fixed compass rose and an inner rotatable compass rose positioned on said base member concentric with said fixed compass rose, said fixed compass rose provided on its face with a plurality of U-shaped slots concentric therewith, and a plurality of radial arms each supported in all of said slots and adapted to rotate about the center axis of said compass roses to indicate bearings thereon.

6. A navigation chart protractor comprising a base member having two concentric compass roses thereon and provided on its face with a plurality of U-shaped slots concentric therewith, one of said compass roses fixed and the other rotatable with respect to said base, and a plurality of radial arms each supported in all of said slots and adapted to rotate about the center axis of said compass roses to indicate relative bearings thereon.

7. A navigation chart protractor comprising a base member having a compass rose thereon and provided with a pair of U-shaped slots concentric therewith, a plurality of radial arms each supported in both of said slots and adapted to rotate about the center axis of said compass rose to indicate relative bearings thereon, and means in the center of said compass rose for marking the center position on a chart with respect to the bearings to which said arms are set.

CHARLES L. STURTEVANT.
WILLIAM R. McCATHRAN, Jr.

REFERENCES CITED

The following references are of record in the file of this patent:

UNITED STATES PATENTS

| Number | Name | Date |
|---|---|---|
| 490,121 | Leighton | Jan. 17, 1893 |
| 527,035 | Boswell | Oct. 2, 1894 |
| 878,819 | Mooney | Feb. 11, 1908 |
| 918,947 | Boljahn | Apr. 20, 1909 |
| 1,226,141 | Sterling et al. | May 15, 1917 |
| 2,278,440 | Graves | Apr. 7, 1942 |

FOREIGN PATENTS

| Number | Country | Date |
|---|---|---|
| 1,661 | Great Britain | 1853 |
| 20,652 | Great Britain | 1897 |
| 173,780 | Switzerland | Mar. 9, 1934 |
| 468,102 | Germany | Nov. 6, 1928 |

Certificate of Correction

Patent No. 2,488,570                                                           November 22, 1949

CHARLES L. STURTEVANT ET AL.

It is hereby certified that error appears in the above numbered patent requiring correction as follows:

In the grant, line 17, after the words and period, "Territories thereof." insert *Provided, however, that the said invention may be manufactured and used by or for the Government for governmental purposes without the payment of any royalty thereon.* and that the said Letters Patent should be read with this correction therein that the same may conform to the record of the case in the Patent Office.

Signed and sealed this 3rd day of January, A. D. 1950.

[SEAL]

THOMAS F. MURPHY,
                                                             *Assistant Commissioner of Patents.*